(12) United States Patent
Dutta et al.

(10) Patent No.: US 7,552,081 B2
(45) Date of Patent: Jun. 23, 2009

(54) USER RATING SYSTEM FOR ONLINE AUCTIONS

(75) Inventors: Rabindranath Dutta, Austin, TX (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2036 days.

(21) Appl. No.: 09/895,097

(22) Filed: Jun. 29, 2001

(65) Prior Publication Data

US 2003/0004855 A1      Jan. 2, 2003

(51) Int. Cl.
G06Q 40/00      (2006.01)
(52) U.S. Cl. .............................. 705/37; 705/35; 705/5; 705/80; 705/26
(58) Field of Classification Search ................ 705/37
See application file for complete search history.

(56) References Cited

U.S. PATENT DOCUMENTS 5,689,652 A     11/1997   Lupien et al. ............... 395/237
6,041,308 A     3/2000    Walker et al. ................ 705/14
6,622,131 B1 *  9/2003    Brown et al. ................. 705/38
6,907,405 B2 *  6/2005    Brett ............................ 705/37
6,952,682 B1 * 10/2005    Wellman ...................... 705/37

OTHER PUBLICATIONS ebay.com—from wayback machine (www.archive.org) site on Mar. 1, 2000.*
wysiwyg://233/http://pages.ebay.com/services/forum/feedback.html, "The Feedback Forum: One of Your Most Valuable Tools", Feb. 2001, pp. 1-2.

* cited by examiner

*Primary Examiner*—Kirsten S Apple
(74) *Attorney, Agent, or Firm*—Yee & Associates, P.C.; Jeffrey S. LaBaw (57) ABSTRACT

A method, computer program product, and apparatus for providing a user rating service for online auctions is disclosed. Objective criteria, such as credit information, are combined with subjective ratings to create a user profile. Using objective criteria to supplement user ratings treats new users more fairly and prevents auction participants from inflating their ratings collusively. The user profile may be shared among online auction services, so that a user's aggregate transaction and ratings history may be used at a number of sites.

33 Claims, 6 Drawing Sheets

REGISTRATION DATABASE — 500

| USER ID | ADDRESS INFORMATION | CURRENT RATING | BUYING LIMIT | SELLING LIMIT | CREDIT INFORMATION |
|---|---|---|---|---|---|
|  |  |  |  |  |  |

502, 504, 506, 508, 510, 512

RATINGS DATABASE — 514

| USER ID | RATING | BUYING LIMIT | SELLING LIMIT |
|---|---|---|---|
|  |  |  |  |

516, 518, 520, 522

MERCHANDISE DATABASE — 524

| ITEM ID | SELLER ID | QUANTITY | DESCRIPTION | PHOTO/ IMAGE | AUCTION PERIOD |
|---|---|---|---|---|---|
|  |  |  |  |  |  |

526, 528, 530, 532, 534, 536

TRADING HISTORY DATABASE — 538

| BUYER/ SELLER ID | DATE | VALUE OF TRANSACTION | COMMENTS BY SELLER | COMMENTS BY BUYER |
|---|---|---|---|---|
|  |  |  |  |  |

FIG. 12

USER RATING SYSTEM FOR ONLINE AUCTIONS

BACKGROUND OF THE INVENTION

1. Technical Field

The present invention is directed generally toward rating systems for online auctions. In particular, the present invention is directed toward a method, computer program product, and apparatus for providing a user rating service for online auctions that uses objective rating criteria to promote fairness and that allows ratings to be shared among online auction services.

2. Description of Related Art

In any society in which division of labor is present, there exists the fundamental problem of valuation. When a person exchanges goods or services for other goods, services, money, or other resources, it is always necessary to make an inquiry into the value of the goods, services, or money exchanged.

According to basic principles of economics, trading resources according to their proper valuation should bring about the most efficient use of available resources. In practice, however, valuation of resources is anything but easy. Each party in an economic transaction can be assumed to be acting in his or her own best interest, and that best interest is almost certainly opposed to that of the other, assuming a two-party transaction. Thus, a seller will want to receive a high price for a good, and a buyer will want to pay a low price (no price at all is even better).

To complicate matters, many resources are difficult to value simply because the parties to a transaction have access to only limited information about the resource. A prime example of this is corporate stock. The ownership rights to a portion of a corporation are difficult to value, simply because much of the information pertaining to a corporation and its earning potential is not public, and much of what is public cannot be predicted.

To solve this fundamental problem of valuation, people have, over time, devised different market mechanisms or negotiating schemes for determining resource values. Auctions, where buyers submit bids and certain buyers "win" (buy the product) and other buyers "lose" (are prevented from buying the product) are a common market mechanism.

Online selling through the Internet has made it simpler to search for and purchase products (particularly hard to find items), because of automated searching. Online auctioning, in particular, is a convenient means for buying and selling products, because, unlike conventional auctioning, online auctioning is not limited by any physical space—anyone can buy or sell from anywhere in the world.

This enormous flexibility is not without some drawbacks, however. Many merchants and consumers are less than reputable—that much is axiomatic. For this reason, merchants and consumers in a physical environment attempt to shield themselves from disreputable commercial conduct in a number of ways. These range from the objective (e.g., relying on a credit report to screen customers) to the subjective (e.g., relying on one's intuitive sense of a person's honesty to screen customers or merchants). In an online environment, however, many of these safeguards disappear.

As an attempt to remedy this inability to screen potential business contacts, the online auction house eBay, Inc., of San Jose, Calif., has developed a rating system, whereby buyers and sellers rate other buyers and sellers with whom they do business. This rating system provides users of eBay's online auction facility with information they can use when deciding when to do business with another user. Thus, eBay allows its users to view others' subjective observations with regard to other users.

The eBay rating system, however, is purely subjective and must rely solely on user comments. This is problematic for two reasons. One is that new users, who have little or no ratings from other users, are at a disadvantage, because their ratings will be low until enough other users give them positive ratings. Another is that it is easy to abuse such a rating system by engaging in sham transactions with co-conspirators to give each other high ratings.

Another drawback to eBay's rating system is that the information that eBay collects is only usable at eBay's website. It cannot be used at other Internet auction sites.

What is needed, then, is a rating system that includes some objective criteria for determining ratings.

SUMMARY OF THE INVENTION

The present invention provides a method, computer program product, and apparatus for providing a user rating service for online auctions. Objective criteria, such as credit information, are combined with subjective ratings to create a user profile. Using objective criteria to supplement user ratings treats new users more fairly and prevents auction participants from inflating their ratings collusively. The user profile may be shared among online auction services, so that a user's aggregate transaction and ratings history may be used at a number of sites.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
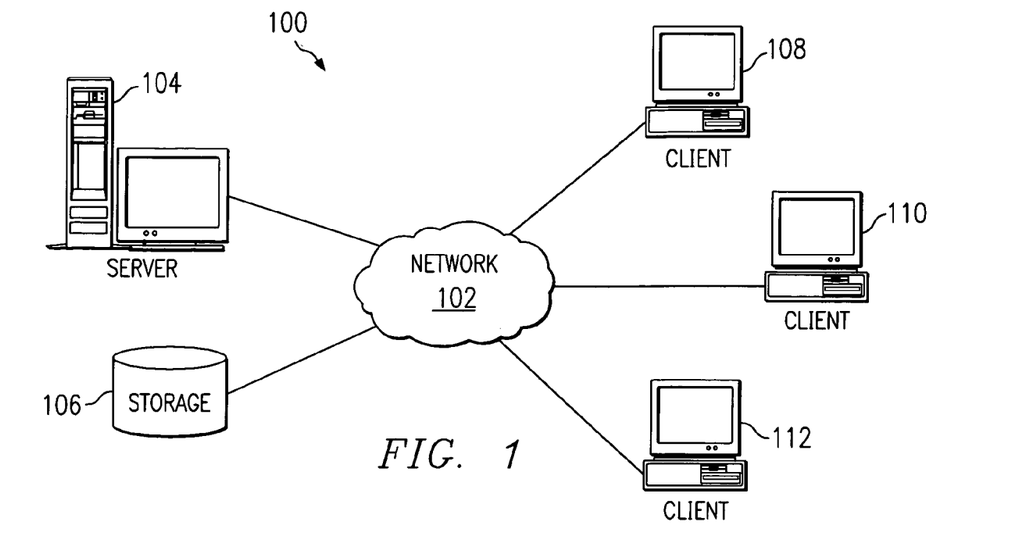
FIG. 1 is a diagram of a networked data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
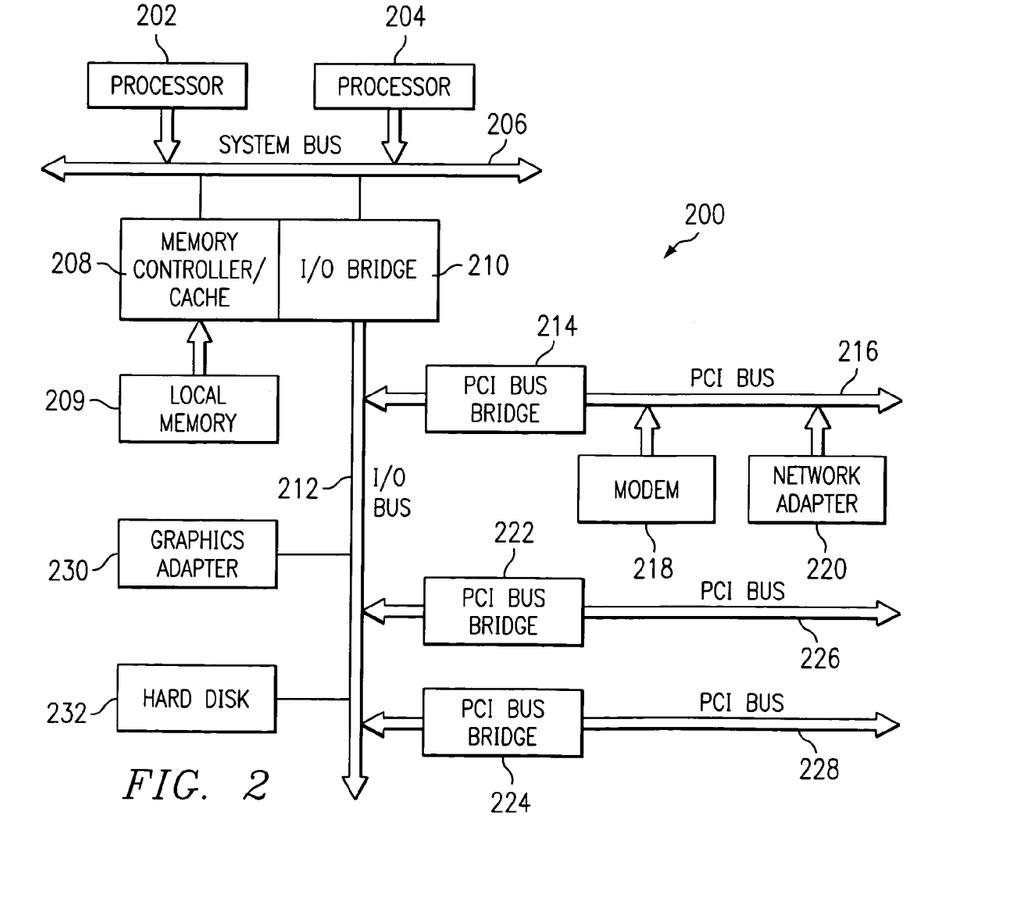
FIG. 2 is a block diagram of a server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
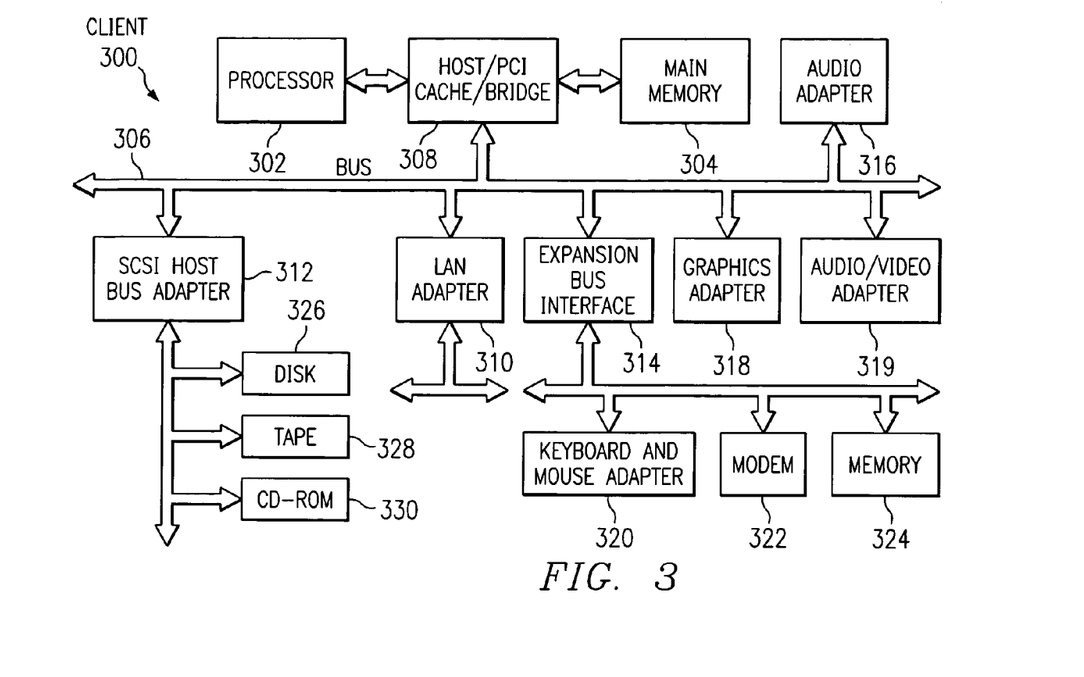
FIG. 3 is a block diagram of a client in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
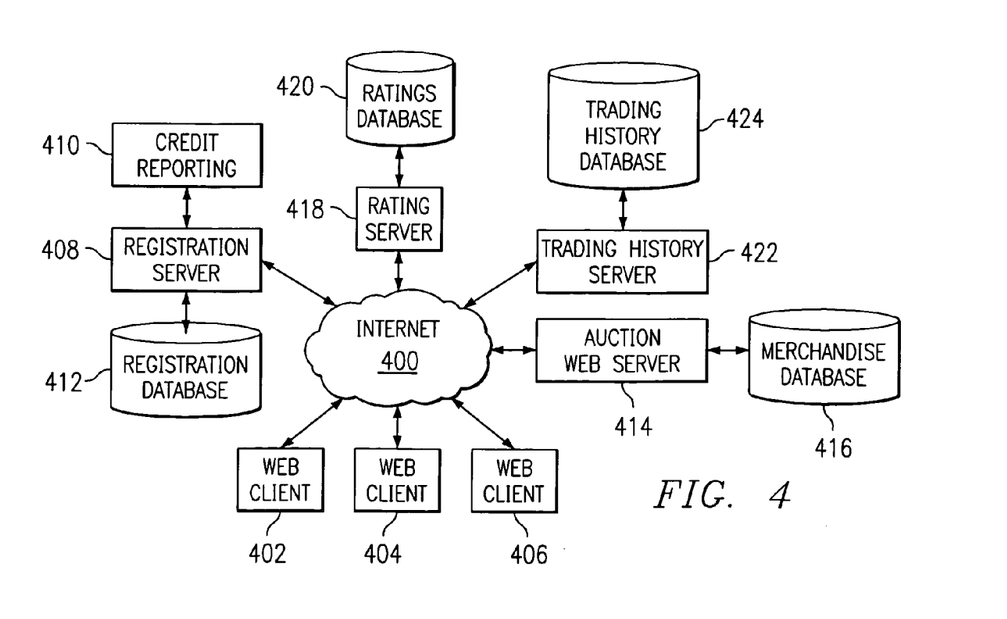
FIG. 4 is a diagram of a preferred embodiment of the present invention.

FIG. 4 provides an overall view of a preferred embodiment of the present invention. Internet 400 connects web clients 402-406 with various servers. Web clients 402-406 contain browser software for viewing hypertext documents from servers within the World Wide Web.

Hypertext is a method of organizing textual and graphical information on a computer screen. Information is organized into "pages," which resemble printed pages in a book or (perhaps more accurately) printed scrolls (since a hypertext page can be of any length). The primary difference between hypertext and the printed word, however, lies in the fact that hypertext pages can contain links. That is, a portion of a hypertext document, such as a phrase or a graphic, may be made sensitive to clicking by the mouse such that when the user clicks on that portion, the user is directed to a new page or a different section of the current page. For instance, it is a common practice to make bibliographic citations into links. When a user clicks on one of these citations, the cited text appears on the screen. Hypertext documents are displayed using a program called a "browser."

The largest and best-known repository of hypertext documents is the World Wide Web, a loosely bound collection of publicly accessible hypertext documents stored on computers the world over. The World Wide Web has become the preferred Internet medium for publishable information as well as for providing such interactive features as online shopping—to the extent that the terms Internet and World Wide Web are virtually synonymous to some.

Browsers can download hypertext documents from a server with the HyperText Transfer Protocol (HTTP). HTTP allows a browser to request documents or files from a server and receive a response. In addition, when browser users enter information into a form embedded into an hypertext page, the browser transmits the information to a server using HTTP. Form information can then be passed along to applications residing on the server by way of the Common Gateway Interface (CGI). Those applications can then return a result, which may be written in HTML.

Registration server 408, an HTTP-enabled server, functions as the main contact point for establishing user accounts. A user of web client 402, may register as a buyer or seller by entering appropriate information into a hypertext form and transmitting the information to registration server 408. Registration server 408 collects this information and combines it with objective information to form a user rating. The objective information may include a credit report from credit reporting service 410, for instance. The user rating may be calculated by any appropriate formula. Registration server 408 stores the user's rating in registration database 412.

Auction web server 414, an HTTP-enabled server, functions as the main contact point for online auctions. Auction web server 414 communicates with merchandise database 416, which stores information regarding items being auctioned, current bids, and auction times. A seller using web client 404 can, for example, interact with auction web server 414 through hypertext-based forms to establish an auction for a particular item. A buyer using web client 402, for example, can then place bids for an item by transmitting data from a hypertext form to auction web server 414.

Rating server 418, which may or may not be the same as registration server 408, handles requests for and updates of users' rating information. Rating server 418 stores the users' rating information in ratings database 420, which may or may not be the same as registration database 412. Having a separate rating server and database storing only a subset of information may provide an added security benefit, as the separate rating server and database need not have direct access to sensitive use data, such as a user's credit report. Auction web server 414 requests a user's rating information from rating server 418 whenever the user wishes to take part in a buy or sell transaction.

Preferably, multiple auction web servers utilize the information stored in rating server 418. In a preferred embodiment, rating server 418 is operated by a trusted third-party that is neither directly affiliated with any users nor directly affiliated with any of the online merchants.

Trading history server 422 records users' transactions in trading history database 424. Trading history server 422 cooperates with rating server 418 to update users' ratings as they engage in buying and selling transactions.

Figure 5:
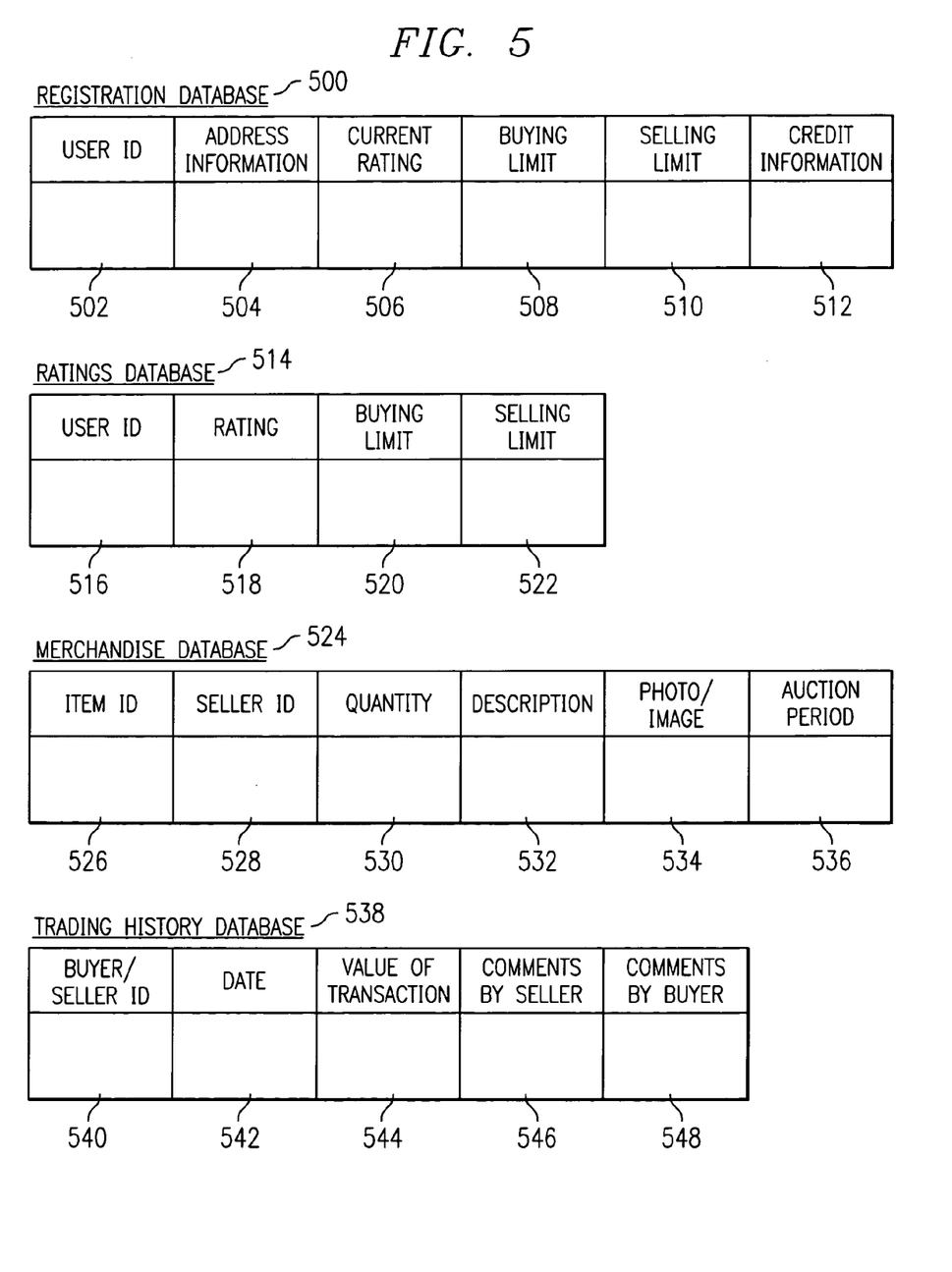
FIG. 5 is a diagram of data structures used within databases of a preferred embodiment of the present invention.

FIG. 5 provides a tabular diagram describing information stored in each of the databases of FIG. 4. Table 500 describes the contents of data records stored within registration database 412. User ID 502 contains information for identifying and authenticating a user, including a user identification string, a password, and the user's real name. Address information 504 contains addresses and telephone numbers for contacting the user or shipping products to the user.

Rating level 506 is calculated based on objective data, such as credit information 512 (q.v.), and positive and negative feedback from other users. Buying limit 508 and selling limit 510 provide maximum monetary amounts of items that the user may buy or sell. These limits may be defined with respect to a time period (e.g., the maximum dollar amount that may be bought within any given month) or they may be defined with respect to one or more transactions (e.g., the maximum value of an item that may be sold by the user). Much like a credit limit on a credit card, these limits protect sellers from buyers who may tend to overextend their finances and limit the potential losses incurred by buyers who buy from less reputable sellers. Credit information 512 is used to derive buying limit 508 and selling limit 510; it may also be used in determining a value for rating level 506.

Table 514 describes the data contained within ratings database 420. Ratings database 420 contains a user ID 516, rating 518, buying limit 520, and selling limit 522 for each user. Ratings database 420 thus comprises a subset of the information in registration database 500.

Table 524 describes the contents of merchandise database 416. For each individual auction, item identification information 526, an identification of the seller 528, a quantity to be sold 530, a description of the item 532, an optional photo or image of the item 534, and a time period over which the auction takes place 536 are stored.

Table 538 describes the information stored within trading history database 424. For each transaction (buy or sell) identifications of buyer and seller 540, a transaction date 542, a transaction value 544, seller comments about the buyer 546, buyer comments about the seller 548 are stored.

Figure 6:
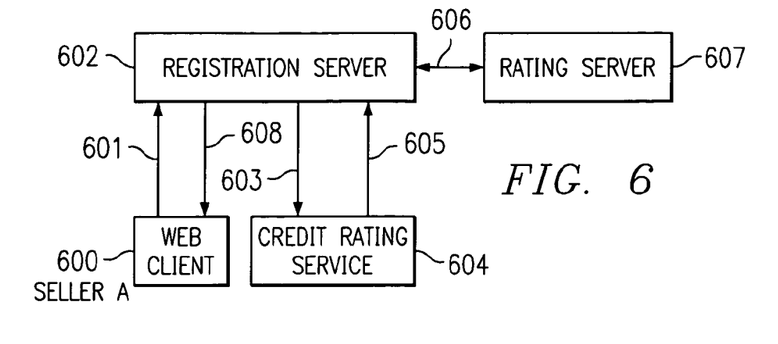
FIG. 6 is a diagram of a process of registering a user in a preferred embodiment of the present invention.

FIG. 6 is a diagram depicting a process of registering a user in a preferred embodiment of the present invention. Web client 600 provides personal information 601 regarding the registering user to registration server 602. If so authorized by the user, registration server 602 requests 603 credit information from credit reporting service 604. Credit rating service 604 sends 605 credit information to registration server 602. Registration server 602 combines the credit information with the user's personal information to derive a reliability rating for the user. Registration server 602 then shares 606 the user rating and other pertinent information with rating server 607. Finally, registration server 602 transmits 608 a user ID for the now registered user to web client 600.

Figure 7:
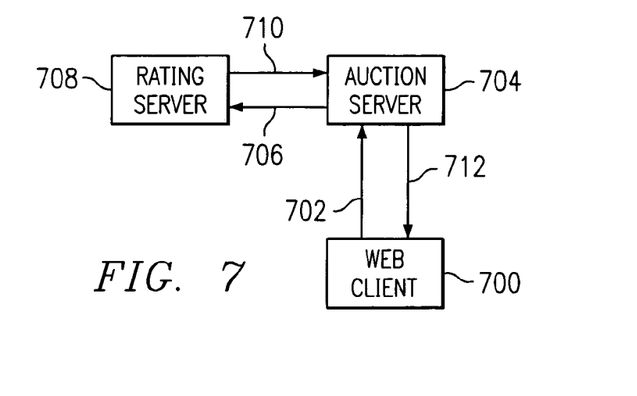
FIG. 7 is a diagram of a process of establishing an auction of a particular item in a preferred embodiment of the present invention.

FIG. 7 is a diagram depicting the establishment of an auction by a seller in accordance with a preferred embodiment of the present invention. Web client 700, operated by the seller, transmits 702 a request to set up an auction for a particular item or set of items to auction server 704. Auction server 704 then requests 706 rating information regarding the seller from rating server 708. Rating server 708 transmits 710 the seller's rating information back to auction server 704. At this point, auction server 704 determines whether the proposed auction is allowable in light of the seller's rating information (e.g., the value of the auctioned item does not exceed the seller's selling limit or the seller has a high enough rating to establish an auction). If it is, then the auction is established. Finally, auction server 704 transmits notification of the approved or rejected auction to web client 700.

Figure 8:
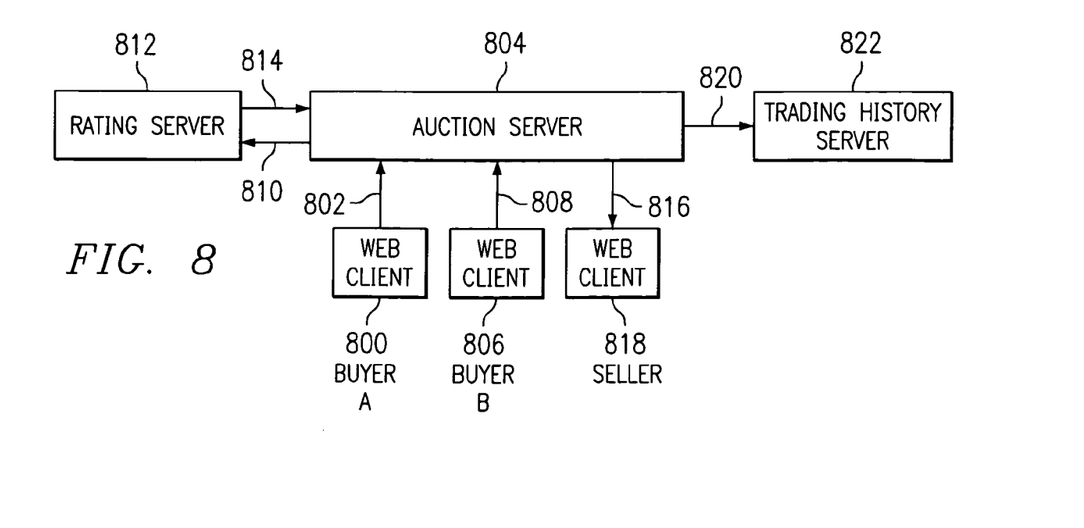
FIG. 8 is a diagram of a process of conducting an auction in a preferred embodiment of the present invention.

FIG. 8 is a diagram depicting the operation of an auction in accordance with an embodiment of the present invention. Web clients 800 and 806 submit bids 802, 808 to auction server 804. Auction server 804, at the close of the auction, determines the winning bidder. Auction server 804 submits 810 a request to rating server 812 for rating information regarding the winning bidder. This information is transmitted 814 back to auction server 804, which in turn transmits 816 the information to web client 818, operated by the seller. In this way, the seller can make informed decisions regarding whether to accept the results of the auction (from a legal standpoint, in most auctions the seller makes the final acceptance of the contract between the buyer and seller) how payment and shipping of the item will be handled. For instance, if the buyer is not reputable, the seller may require payment in advance before shipping the item. In addition, auction server 804 may intervene and prevent a transaction from occurring, if the buyer would be overextending the buyer's buying limit. Finally, trading history server 822 is notified of the transaction.

At some later time, trading history server 822 will report its updated information concerning the buyer and seller to rating server 812, including any feedback from the buyer or seller regarding the transaction. Feedback may be transmitted to auction server 804 from a web client by either the buyer or seller and recorded by trading history server 822.

Figure 9:
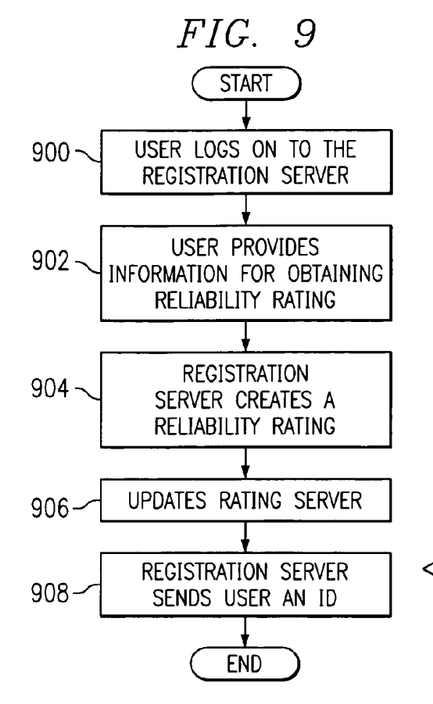
FIG. 9 is a flowchart representation of a process of registering a user in a preferred embodiment of the present invention.

FIG. 9 is a flowchart representation of a process of registering a user (a buyer or seller) within a rating system in accordance with a preferred embodiment of the present invention. First, a user logs on (accesses) the registration server (step 900). Then, the user provides personal information, such as a name, address, and perhaps one or more identification numbers, such as a social security number, for obtaining a credit report, if the user so authorizes (step 902). The registration server creates a reliability rating for the user based on the provided information (step 904). Then, the registration server updates the rating server to include the new rating (step 906). Finally, the registration server provides a user ID to the now registered user (step 908).

Figure 10:
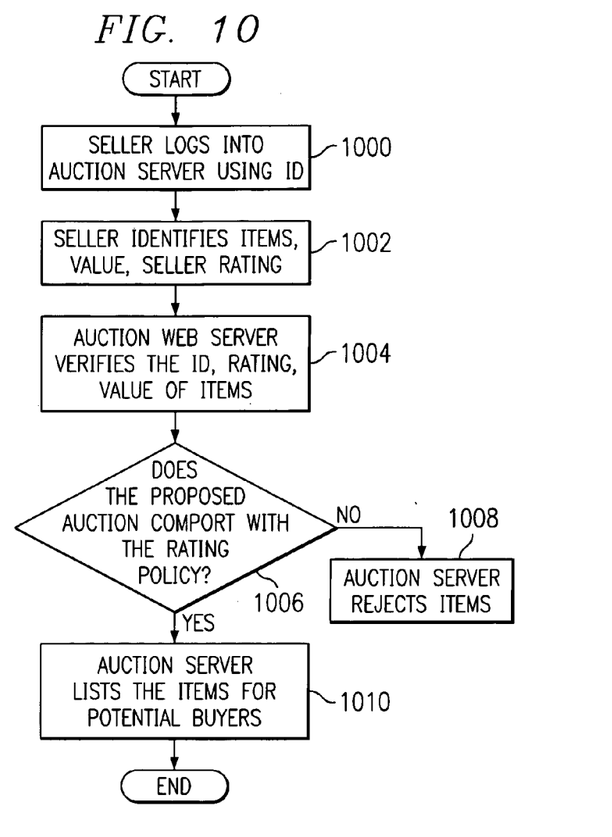
FIG. 10 is a flowchart representation of a process of establishing an auction of an item in a preferred embodiment of the present invention.

FIG. 10 is a flowchart representation of a process of establishing an online auction in accordance with an embodiment of the present invention. First, a seller logs into an auction (web) server using the seller's user ID (step 1000). Then, the seller identifies to the auction server the items to be auctioned, their approximate value, and the seller's reliability rating (step 1002). The auction server then uses the seller's user ID to verify the seller's rating; it also verifies the approximate value of the items (step 1004). Next, the auction server determines if the proposed auction comports with what the seller is allowed to do in terms of selling (i.e., whether the seller is reliable enough to be allowed to sell, and if so, how much merchandise the seller may sell) (step 1006). If not, then the auction server rejects the auctioning of the items (step 1008). If so, however, the auction server lists the items within its merchandise database for potential buyers to place bids on.

Figure 11:
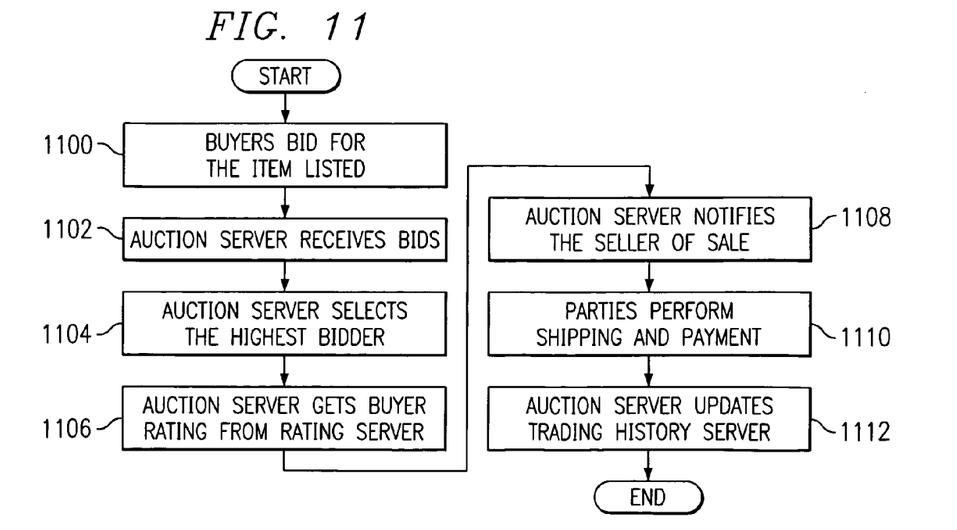
FIG. 11 is a flowchart representation of a process of conducting an auction in a preferred embodiment of the present invention.

FIG. 11 is a flowchart diagram depicting a process of conducting an auction in accordance with a preferred embodiment of the present invention. Buyers bid for a listed item (step 1100). The auction server receives the bids (step 1102). At the close of the auction, the auction server selects the highest bidder (step 1104). At this point, the rating of the highest bidder is retrieved from the rating server (step 1106); the auction server may intervene at this point to prevent the actual purchase from taking place, if the auction server determines that the potential buyer's bid would overextend the buyer's buying limit. Next, the auction server notifies the seller of the results of the auction, including the buyer's reliability rating (step 1108).

At this point, the buyer and seller begin to perform the transaction according to how they negotiate payment and shipping terms (step 1110). The auction server then updates the trading history server with information regarding the auction transaction (step 1112).

Figure 12:
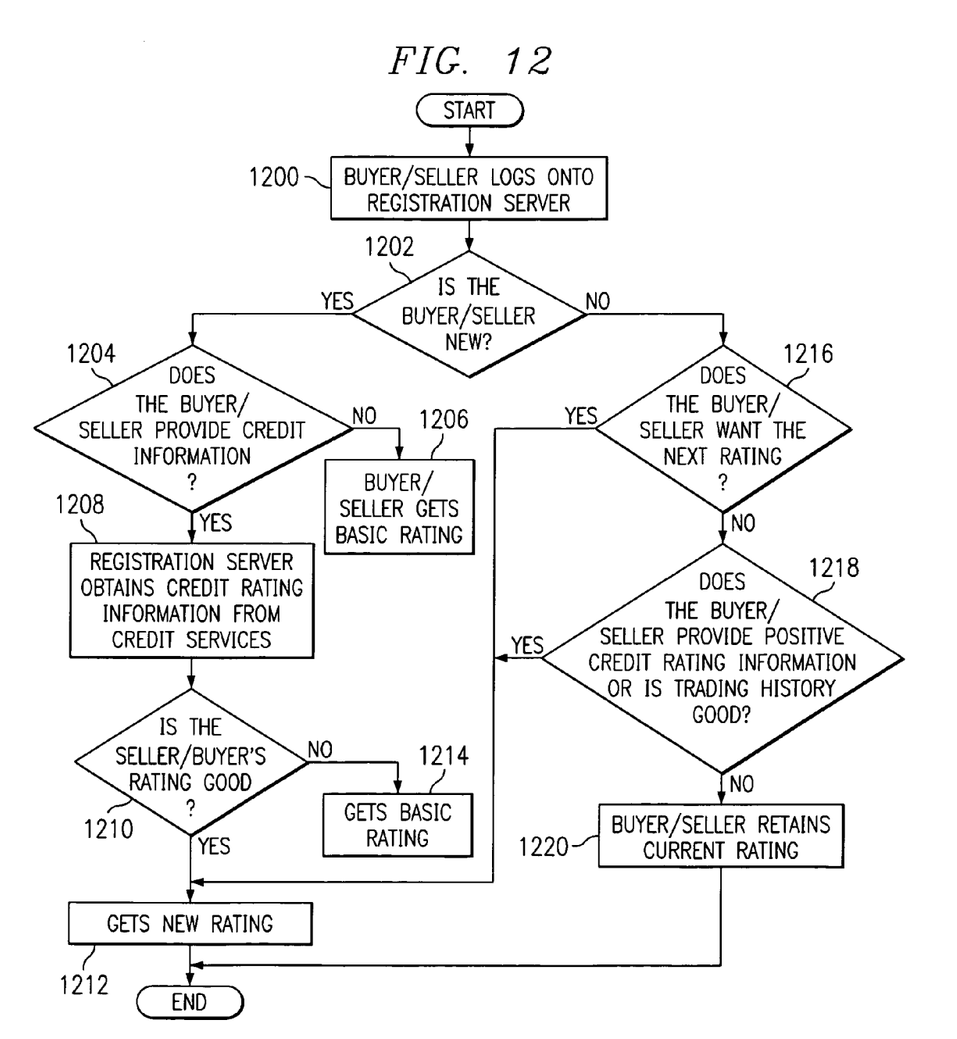
FIG. 12 is a flowchart representation of updating a user's profile in a preferred embodiment of the present invention.

FIG. 12 is a flowchart representation of a process of creating or updating a user's reliability rating in a preferred embodiment of the present invention. First, user (buyer or seller) logs into the registration server (step 1200). If the user is new (step 1202), then the user is asked to authorize access to the user's credit information; if the user does not wish to provide this information (step 1204), the user is given a "basic rating" (step 1206), providing a low level of buying or selling privileges.

If the user does authorize the use of the credit information, the registration server obtains a credit rating from a credit information service (step 1208). If the user's credit rating is positive (step 1210), a higher-than-basic rating is calculated for the user (step 1212). If the user's credit rating is negative, then the user receives a "basic rating" (step 1214).

If the user is not new (step 1202), then the user is prompted as to whether to update the user's rating. If the user wishes to update the user's rating (step 1216), a new rating based on the amount purchased or sold and any positive or negative feedback from other users is calculated for the user (step 1212).

If the user does not opt to receive the next rating, it is determined whether the user has positive information or trading history that would warrant an increase in rating (step 1218). If so, then a new rating is calculated for the user (step 1212). If not, the user retains the user's current rating (step 1220).

One of ordinary skill in the are will appreciate that many variations on the present invention are possible. For instance, in accordance with an alternative embodiment of the present invention, sellers' reliability ratings can be displayed to prospective bidders, so that bidders may be more selective with their bidding. A number of other variations are possible by consolidating one or more subsets of the servers utilized; for instance, it is entirely possible for the registration server, rating server, trading history server, and auction server to all be the same server.

Also, a user who receives an unfavorable reliability rating may wish to discover why the user was rated poorly. In such cases, the user may be provided with an explanation for why the user was given a low rating.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of rating an online auction user comprising the steps of:
   receiving personal information regarding the user;
   based on the personal information, obtaining objective information by a Registration Server about the user from a third party; and
   formulating an initial value by the Registration Server for a reliability rating based on at least the objective information.

2. The method of claim 1, wherein the objective information includes a credit report.

3. The method of claim 1, wherein the personal information is received from a web client.

4. The method of claim 1, comprising the additional steps of:
   receiving a transaction history for the user; and
   modifying the reliability rating based on the transaction history.

5. The method of claim 1, comprising the additional steps of:
   receiving feedback about the user; and
   based on the feedback, modifying the reliability rating.

6. The method of claim 1, comprising the additional step of:
   sharing the reliability rating with at least one auction server.

7. The method of claim 1, wherein the reliability rating includes at least one of a buying limit and a selling limit.

8. The method of claim 1, comprising the additional step of:
   presenting to the user a rationale for why the user received the initial value.

9. A method in a data processing system for managing auctions, the method comprising:
   receiving personal data about a user;
   based on the personal data, obtaining objective information by a Registration Server about the user from a third party;
   formulating an initial value by the Registration Server for a reliability rating based on at least the objective information for the user; and
   based on the user's reliability rating, regulating the user's access to selected auctions.

10. The method of claim 9, wherein regulating the user's access to the selected auctions includes one of denying the user access to the selected auctions and allowing the user access to the selected auctions.

11. The method of claim 9, wherein the objective information includes a credit report.

12. The method of claim 9, wherein the personal information is received from a web client.

13. The method of claim 9, comprising the additional steps of:
    receiving a transaction history for the user; and
    modifying the user rating based on the transaction history.

14. The method of claim 9, comprising the additional steps of:
    receiving feedback about the user; and
    based on the feedback, modifying the user rating.

15. The method of claim 9, comprising the additional step of:
    sharing the user rating with at least one auction server.

16. The method of claim 9, wherein the user rating includes at least one of a buying limit and a selling limit.

17. The method of claim 9, comprising the additional step of:
    presenting to the user a rationale for why the user received the user rating.

18. A computer program product in a computer-readable medium rating an online auction user comprising instructions for:
    receiving personal information regarding the user;
    based on the personal information, obtaining objective information by a Registration Server about the user from a third party; and
    formulating an initial value by the Registration Server for a reliability rating based on at least the objective information.

19. The computer program product of claim 18, wherein the objective information includes a credit report.

20. The computer program product of claim 18, wherein the personal information is received from a web client.

21. The computer program product of claim 18, comprising additional instructions for:
    receiving a transaction history for the user; and
    modifying the reliability rating based on the transaction history.

22. The computer program product of claim 18, comprising additional instructions for:
    receiving feedback about the user; and
    based on the feedback, modifying the reliability rating.

23. The computer program product of claim 18, comprising additional instructions for:
    sharing the reliability rating with at least one auction server.

24. The computer program product of claim 18, wherein the reliability rating includes at least one of a buying limit and a selling limit.

25. The computer program product of claim 18, comprising additional instructions for:
    presenting to the user a rationale for why the user received the initial value.

26. A data processing system for rating an online auction user comprising:
- a bus system;
- a memory connected to the bus system;
- a processing unit including at least one processor; and
- a set of instructions located within the memory,
- wherein the processing unit executes the set of instructions to perform the acts of:
- receiving personal information regarding the user;
- based on the personal information, obtaining objective information by a Registration Server about the user from a third party; and
- formulating an initial value by the Registration Server for a reliability rating based on at least the objective information.

27. The data processing system of claim 26, wherein the objective information includes a credit report.

28. The data processing system of claim 26, wherein the personal information is received from a web client.

29. The data processing system of claim 26, wherein the processing unit executes the set of instructions to perform the additional acts of:
- receiving a transaction history for the user; and
- modifying the reliability rating based on the transaction history.

30. The data processing system of claim 26, wherein the processing unit executes the set of instructions to perform the additional acts of:
- receiving feedback about the user; and
- based on the feedback, modifying the reliability rating.

31. The data processing system of claim 26, wherein the processing unit executes the set of instructions to perform the additional act of:
- sharing the reliability rating with at least one auction server.

32. The data processing system of claim 26, wherein the reliability rating includes at least one of a buying limit and a selling limit.

33. The data processing system of claim 26, wherein the processing unit executes the set of instructions to perform the additional act of:
- presenting to the user a rationale for why the user received the initial value.

* * * * *